(12) United States Patent
Reul

(10) Patent No.: US 8,481,857 B2
(45) Date of Patent: Jul. 9, 2013

(54) WINDOWPANE HAVING AN ELECTRICAL FLAT CONNECTING ELEMENT

(75) Inventor: Bernhard Reul, Herzogenrath (DE)

(73) Assignee: Saint-Gobain Glass France, Aubervilliers (FR)

( * ) Notice: Subject to any disclaimer, the term of this patent is extended or adjusted under 35 U.S.C. 154(b) by 215 days.

(21) Appl. No.: 12/744,052

(22) PCT Filed: Dec. 5, 2008

(86) PCT No.: PCT/EP2008/010322
§ 371 (c)(1),
(2), (4) Date: Aug. 6, 2010

(87) PCT Pub. No.: WO2009/074267
PCT Pub. Date: Jun. 18, 2009

(65) Prior Publication Data
US 2010/0294566 A1 Nov. 25, 2010

(30) Foreign Application Priority Data

Dec. 11, 2007 (DE) .......................... 10 2007 059 818

(51) Int. Cl.
*H01B 7/08* (2006.01)
*B60L 1/02* (2006.01)
*H05B 1/00* (2006.01)

(52) U.S. Cl.
USPC ................. 174/117 FF; 174/117 A; 219/203; 219/219

(58) Field of Classification Search
USPC ................. 219/203, 202, 219, 520, 521, 522, 219/523, 532, 536; 361/162, 164; 174/117 A, 174/117 FF, 94 R
See application file for complete search history.

(56) References Cited

U.S. PATENT DOCUMENTS

| 2,502,147 | A | 3/1950 | Groihoase |
| 2,644,066 | A | 6/1953 | Glynn |
| 2,709,211 | A | 5/1955 | Glynn |

(Continued)

FOREIGN PATENT DOCUMENTS

| DE | 19 36 780 A1 | 2/1970 |
| DE | 9013380 | 11/1990 |

(Continued)

OTHER PUBLICATIONS

PCT International Search Report for PCT/EP2008/010322 filed on Dec. 5, 2008 in the name of Saint-Gobain Glass France.

(Continued)

*Primary Examiner* — Hoa C Nguyen
*Assistant Examiner* — Binh Tran
(74) *Attorney, Agent, or Firm* — Steinfl & Bruno LLP

(57) ABSTRACT

The present invention describes a windowpane, in particular vehicle windowpane, having at least one flat-conductor soldered connecting element for making electrical contact, which flat-conductor soldered connecting element has at least one electrically insulating plastic layer and one electrically conductive layer or foil which is connected to a soldering surface for soldering on a line connection which leads on from the windowpane, and which flat-conductor soldered connecting element is adhesively attached to an outer surface of the windowpane, characterized in that at least one electrically insulating buffer layer is provided between a section of the electrically conductive layer or foil with a freely exposed soldering surface, on the one hand, and the surface of the windowpane, on the other.

13 Claims, 2 Drawing Sheets

U.S. PATENT DOCUMENTS

| | | | |
|---|---|---|---|
| 3,364,654 A | | 1/1968 | Peetz et al. |
| 3,616,122 A | * | 10/1971 | Orcutt ........................ 428/38 |
| 3,926,357 A | | 12/1975 | Matrisian |
| 4,023,008 A | | 5/1977 | Durussel |
| 4,213,028 A | * | 7/1980 | Wolf ........................... 219/203 |
| 4,488,033 A | * | 12/1984 | Trachtenberg ............... 219/522 |
| 4,555,607 A | | 11/1985 | Roentgen et al. |
| 4,629,278 A | | 12/1986 | Norton et al. |
| 4,707,591 A | | 11/1987 | Sprenger |
| 4,721,845 A | * | 1/1988 | Kunert et al. ................ 219/203 |
| 4,827,611 A | | 5/1989 | Pai |
| 4,853,520 A | * | 8/1989 | Hochart et al. ............. 219/535 |
| 4,918,288 A | * | 4/1990 | Carter et al. ................. 219/203 |
| 5,053,357 A | | 10/1991 | Lin |
| 5,134,248 A | | 7/1992 | Kiec et al. |
| 5,610,436 A | | 3/1997 | Sponaugle |
| 5,705,848 A | | 1/1998 | Bayerer |
| 5,738,554 A | | 4/1998 | Borger et al. |
| 5,867,128 A | | 2/1999 | Sauer |
| 6,103,034 A | | 8/2000 | Fujiwara et al. |
| 6,103,998 A | | 8/2000 | Kuno et al. |
| 6,103,999 A | | 8/2000 | Nishio et al. |
| 6,217,373 B1 | | 4/2001 | Johnston |
| 6,262,474 B1 | | 7/2001 | Kobayashi et al. |
| 6,384,969 B1 | | 5/2002 | Kani et al. |
| 6,396,026 B2 | | 5/2002 | Gillner et al. |
| 6,406,337 B1 | | 6/2002 | Machado |
| 6,534,720 B2 | * | 3/2003 | Von Alpen et al. ....... 174/149 R |
| 6,793,120 B2 | | 9/2004 | Johnson |
| 7,134,201 B2 | * | 11/2006 | Ackerman et al. ............ 29/857 |
| 7,180,031 B1 | | 2/2007 | Loibl et al. |
| 7,223,939 B2 | * | 5/2007 | Hoepfner et al. ............. 219/203 |
| 7,247,047 B2 | | 7/2007 | Baranski et al. |
| 7,270,548 B2 | | 9/2007 | Jenrich et al. |
| 7,344,059 B2 | | 3/2008 | Johnson |
| 7,514,654 B2 | | 4/2009 | Okajima et al. |
| 7,675,004 B2 | | 3/2010 | Nakajima et al. |
| 2002/0111081 A1 | | 8/2002 | Machado |
| 2003/0034172 A1 | | 2/2003 | Alpen et al. |
| 2003/0155467 A1 | | 8/2003 | Petrenko |
| 2005/0112291 A1 | | 5/2005 | Okajima et al. |
| 2005/0115954 A1 | | 6/2005 | Gerhardinger et al. |
| 2005/0269312 A1 | | 12/2005 | Gerhardinger |
| 2006/0228953 A1 | | 10/2006 | Pereira et al. |
| 2007/0224842 A1 | | 9/2007 | Hoepfner et al. |
| 2007/0235860 A1 | | 10/2007 | Steger et al. |
| 2008/0164248 A1 | | 7/2008 | Reul |
| 2009/0277671 A1 | | 11/2009 | Hahn |

FOREIGN PATENT DOCUMENTS

| | | |
|---|---|---|
| DE | 9013380 U1 | 11/1990 |
| DE | 9313394 U1 | 10/1993 |
| DE | 4304788 A1 | 8/1994 |
| DE | 19856663 A1 | 6/2000 |
| DE | 10046489 | 12/2001 |
| DE | 2364811 | 11/2006 |
| DE | 102005016650 | 11/2006 |
| DE | 10 2006 017675 A1 | 10/2007 |
| DE | 202008015441 U1 | 4/2010 |
| DE | 102009016353 A1 | 10/2010 |
| EP | 0 023 121 A1 | 1/1981 |
| EP | 0 488 878 A1 | 6/1992 |
| EP | 0593940 A | 4/1994 |
| EP | 0 720 253 A2 | 7/1996 |
| EP | 0848 449 A1 | 6/1998 |
| EP | 1 488 972 A1 | 12/2004 |
| EP | 1488972 | 12/2004 |
| EP | 1657964 | 5/2006 |
| EP | 1713124 | 10/2006 |
| FR | 1 104 595 A | 11/1955 |
| FR | 2212734 A | 7/1974 |
| GB | 1163224 A | 9/1969 |
| GB | 1449479 | 9/1976 |
| WO | 98/47200 A1 | 10/1998 |
| WO | 2004/009350 | 1/2004 |
| WO | 2004/068643 A1 | 8/2004 |
| WO | 2007/110610 A1 | 10/2007 |
| WO | 2010/057641 A1 | 5/2010 |

OTHER PUBLICATIONS

PCT Written Opinion for PCT/EP2008/010322 filed on Dec. 5, 2008 in the name of Saint-Gobain Glass France.

EPO Search Report of European Application EP 11 16 5506 in the name of Saint-Gobain Glass France. Mailing date: Oct. 21, 2011.

EPO Search Report of European Application EP 10 15 5181 in the name of Saint-Gobain Glass France. Mailing date: Dec. 2, 2010.

EPO Search Report of European Application EP 10 15 7516 in the name of Saint-Gobain Glass France. Mailing date: Aug. 4, 2010.

EPO Search Report of European Application EP 10 16 9372 in the name of Saint-Gobain Glass France. Mailing date: Dec. 20, 2010.

EPO Search Report of European Application EP 11 16 5501 in the name of Saint-Gobain Glass France. Mailing date: Oct. 13, 2011.

EPO Search Report of European Application EP 11 16 5504 in the name of Saint-Gobain Glass France. Mailing date: Oct. 21, 2011.

PCT International Search Report for PCT/EP2008/010314 filed on Dec. 5, 2008 in the name of Saint-Gobain Glass France.

PCT Written Opinion for PCT/EP2008/010314 filed on Dec. 5, 2008 in the name of Saint-Gobain Glass France.

Non-Final Office Action for U.S. Appl. No. 12/744,054, filed Sep. 9, 2010 in the name of Mitja Rateiczak et al. Mail Date: Jul. 18, 2012.

Notice of Allowance for U.S. Appl. No. 13/341,714, filed Dec. 30, 2011 in the name of Stefan Ziegler et al. Mail Date: May 24, 2012.

Notice of Allowance for U.S. Appl. No. 13/341,714, filed Dec. 30, 2011 in the name of Stefan Ziegler et al. Mail Date: Jul. 18, 2012.

Non-Final Office Action for U.S. Appl. No. 13/341,714, filed Dec. 30, 2011 in the name of Stefan Ziegler et al. Mail Date: Mar. 23, 2012.

Notice of Allowance for U.S. Appl. No. 12/678,284, filed Jul. 1, 2010 in the name of Stefan Ziegler et al. Mail Date: Oct. 14, 2011.

Final Office Action for U.S. Appl. No. 12/678,284, filed Jul. 1, 2010 in the name of Stefan Ziegler et al. Mail Date: Aug. 9, 2011.

Non-Final Office Action for U.S. Appl. No. 12/678,284, filed Jul. 1, 2010 in the name of Stefan Ziegler et al. Mail Date: Apr. 4, 2011.

Final Office Action for U.S. Appl. No. 12/678,284, filed Sep. 9, 2010 in the name of Mitja Rateiczak et al. Mail Date: Nov. 1, 2012.

PCT International Search Report for PCT/EP2008/007878 filed on Sep. 19, 2008 in the name of Saint-Gobain Glass France.

PCT Written Opinion for PCT/EP2008/007878 filed on Sep. 19, 2008 in the name of Saint-Gobain Glass France.

* cited by examiner

WINDOWPANE HAVING AN ELECTRICAL FLAT CONNECTING ELEMENT

CROSS REFERENCE TO RELATED APPLICATIONS

The present application is the US national stage of International Application PCT/EP2008/010322 filed on Dec. 5, 2008 which, in turn, claims priority to German Application 102007059818.3, filed on Dec. 11, 2007.

The invention relates to a windowpane having at least one electrical flat connecting element with the features of the preamble of Patent claim 1.

DE 93 13 394 U1 describes a relevant composite glass pane semicomposed of two individual glass panes and a bonding layer which connects the latter adhesively over a surface and has a heating element made of metal wires which are embedded in the adhesive layer, and having at least one connecting cable which is electrically connected to the heating element and which is provided at its free end, led out of the composite, with a plug-type contact element.

The connecting cable is a flat-conductor connecting element which is bent over by means of the end edge of the glass pane and is secured on the adjoining glass pane surface. As a result it provides a reproduceably positioned connecting surface which is provided, for example, with a plug-type contact element which is embodied as a pushbutton knob or plug-in tab.

The flat-conductor connecting element is itself composed of a tin-plated, thin copper ribbon and an insulating casing made of a tear-resistant plastic based on polymide.

The bonding layer for bonding the outer end section of the connecting cable to the outside of the glass pane is preferably composed of an adhesive based on acrylate, silicone rubber or polysiloxane.

It is to be noted that the plug-type contact element which is connected to the connecting cable does not in itself have to have any fixed connection to the surface of the glass. However, a number of embodiments are described in which the plug-type contact element is directly connected to the surface of the glass pane using various methods (bonding layer, soldering layer, friction welding connection, ultrasonic soldering technique; ultrasonic friction welding technique), even though there is no need to produce any local electrical contact there.

A further flat-conductor soldered connecting element is known from DE 198 56 663 A1. A flat-conductor element which leads out laterally under a housing is soldered there with contact faces arranged on a glass pane.

DE 43 04 788 A1 discloses a car glass pane with electrical functional elements such as heating conductors and/or antenna conductors on whose surface a connecting element is applied in an adhering fashion and which itself comprises soldered contacts for producing electrical connections between said functional elements and electrical lines provided in the connecting element. The soldering points are formed directly on the substrate which supports the conductor structures.

Such soldered connections for connecting external connections to windowpanes, specifically to glass panes, have been known for a long time. It is also known that mechanical stresses, which in an extreme case can lead to damage to the windowpane material and even to breakage, can build up both owing to the application of heat when these soldered connections are produced and owing to different thermal expansion behaviour in the region of the soldering points.

While thermally prestressed glass panes are less susceptible in this regard, damage in the case of composite glass panes which are composed of non-prestressed glass panes occur in particular if the individual glass panes are composed of relatively thin glass. Individual glass panes which are less than 2 mm thick are predominantly used in modern composite glass fabrication in order to reduce the overall weight of the finished glass pane and, of course, also to reduce the overall thickness of said glass pane.

To a certain degree, the mechanical stresses are compensated through the selection of the alloy of the soft soldering metal, which remains relatively soft even in the solid state and can buffer mechanical stresses through creepage. In addition, efforts are made to form coherent soldering surfaces which are as small as possible which, in the case of strong currents, especially for heating purposes, has led to the use of bridge-like soldered connecting elements with two different soldering feet. Such a soldered connecting element is presented, for example, in DE 90 13 380 U1.

As a rule, the connecting elements of car glass panes are pre-equipped for direct connection without using tools after the glass pane has been inserted into the respective opening in the vehicle body, i.e. the manufacturer of the glass pane has to install the entire connecting elements with cross-sectional junctions (from flat conductor to round cable) and plugs in the composite.

These connecting elements are relatively expensive. As a result, undesired additional losses in value can occur if, after the ultimate manufacture of the composite, not only the glass panes as such but also the connecting elements which are not connected thereto in such a way that they can be re-used have to be rejected.

The invention is based on the object of specifying a glass pane with at least one connecting element with which, given a simple and economical design, increased loading of the surface of the glass pane by stresses which result from soldering in situ, that is to say on the surface of the glass pane, can be avoided, in which case this connecting element can at the same time be used in the universal fashion on monolithic and composite glass panes.

This object is achieved according to the invention by means of the features of Patent claim 1. The features of the subclaims present advantageous developments of this invention.

If, in the case of a connecting element which is adhesively attached to the surface of the glass pane, between a section of the electrically conductive layer or foil with a freely exposed soldering surface on the one hand and the surface of the glass pane on the other, at least one electrically insulating buffer layer is provided, as a result a direct heat effect on the glass pane or the glass itself is at least damped at the specific soldering point. As a result, local differentiation can occur between the unavoidable soldering points in order to make electrical contact with the electrical structures which are provided in, at or on the windowpane, and the connecting point at which the external contacts have to be provided later.

Specifically in the application case of a composite glass pane, the "internal" formation of contact can occur in the uncritical surface area somewhat further from the outer edge of the glass pane where no, or only extremely low, tensile stresses are present in the surface of the glass.

In contrast, the "external soldering" can take place in a somewhat less critical region on the external surface of the composite glass pane, but damped to a certain extent by the heat-damping intermediate layer in view of possible thermal damage so that there is no risk of damage due to local overheating here either.

This permits, in particular, rather expensive connecting elements to be ultimately connected only after the complete manufacture of the composite glass pane and final quality control.

Further details and advantages of the subject matter of the invention emerge from the drawing of an exemplary embodiment and its subsequent detailed description below.

In said drawing, in a simplified illustration which is not to scale,

Figure 1:
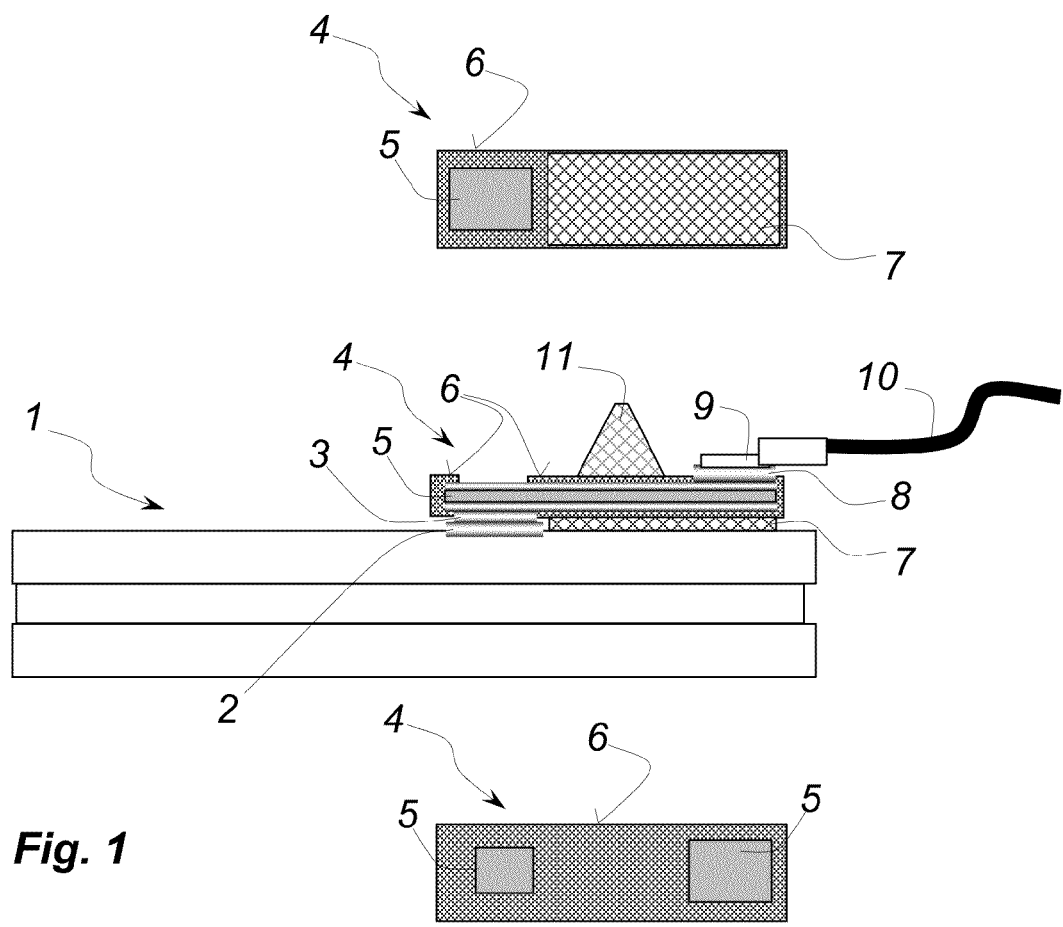
FIG. 1 shows a first embodiment of a soldered connecting element which is provided on a windowpane and has two folded views of the soldered connecting element.

According to FIG. 1, a windowpane 1 (of which only a small detail is shown) composed of composite glass (two rigid glass panes and an intermediate layer connecting them adhesively over a surface) has an electrical conductive structure 2 on one of its free outer surfaces. The latter is composed in this exemplary embodiment in a customary fashion of a screen printed paste with silver particles which are burnt into the glass surface and it is therefore illustrated slightly countersunk therein. However, it is, of course, also possible to use other configurations of surface-adhering conductive structures.

A flat-conductor connecting element 4, to be more precise a metallic conductive foil 5 of this connecting element 4, is connected to the conductive structure 2 in an electrically conductive fashion by means of a thin layer 3 of solder. The conductive foil 5 is illustrated here pretinned on both sides. However, this is not absolutely necessary but is merely a consequence of the fact that such foils are manufactured on a large industrial scale from very thin layers of solder with this pretinning.

Apart from this, the conductive foil 5 is almost completely surrounded by an insulating foil sheath 6 which is removed locally only at the locations required for the formation of electrical contact with the conductive foil 5.

Typical flat-conductor connecting elements are preferably composed of a pretinned copper ribbon with a thickness of 0.01 mm to 0.08 mm and a width of 2 mm to 16 mm and an insulating jacket made of a tear-resistant plastic based on polymide; the overall thickness of this connecting element is, including the insulating jacket, preferably less than 0.3 mm. The layer thicknesses are illustrated here in a significantly exaggerated form only for the sake of illustration.

By means of an adhesive layer 7, also several fractions of a millimeter thick, which is provided on the insulating sleeve 5 on its surface facing the windowpane 1, the entire connecting element 4 is connected in a fixedly adhesive fashion to the surface of the windowpane 1 next to the location of the conductive structure 2. It is possible, in a manner known per se, to provide, in contrast to the illustration, that this adhesive layer 7 completely surrounds at least the actual soldering point, while a section of the conductive structure 2 can run through, in its further course (not illustrated here), under the adhesive layer 7.

The connecting element 4 also has on its surface facing away from the windowpane 1 a soldered connecting point at which the insulating sleeve is removed locally so that the pretinned surface of the conductive foil is exposed. A soldering foot 9 of a cable 10 is in turn electrically connected to the conductive foil 5 of the connecting element 4 by means of a thin layer 8 of solder. The cable can be connected to the soldering foot 9 by crimping, as illustrated.

The connecting point for the cable 10 can be seen to be significantly offset laterally with respect to the connecting point of the same connecting element for the conductive structure 2. Furthermore, both part of the insulating sleeve 5 and the adhesive layer 7 are located between this connecting point and the surface of the glass pane. This makes it possible, after fabrication of the composite glass pane, to solder the cable connection or soldering foot 9 onto the corresponding connecting point without an excessive heat effect. The connecting element forms, in a certain way, a prolongation of the cable 10 which also could have been purely functionally soldered directly to the conductive structure 2.

Furthermore, a strand 11 of adhesive indicated schematically as a triangle, can also be seen in FIG. 1. The longitudinal course of said strand 11 of adhesive therefore extends perpendicularly with respect to the plane of drawing in the viewing direction. In the process it crosses over the section of the flat-conductor connecting element 4 which is located between the two soldering points. The reader's attention is once more drawn to the fact that the connecting element 4 is actually only a few tenths of a millimeter thick so that the strand 11 of adhesive can be applied easily by means of an extrusion tool over the connecting element which itself adheres to the surface of the glass pane. Such a method of implementation would not be so easily possible with a customary round cable such as the cable 10.

The configuration of the soldered connecting element 4 is illustrated on its upper side (bottom) and its underside (top) with two folded individual views.

Figure 2:
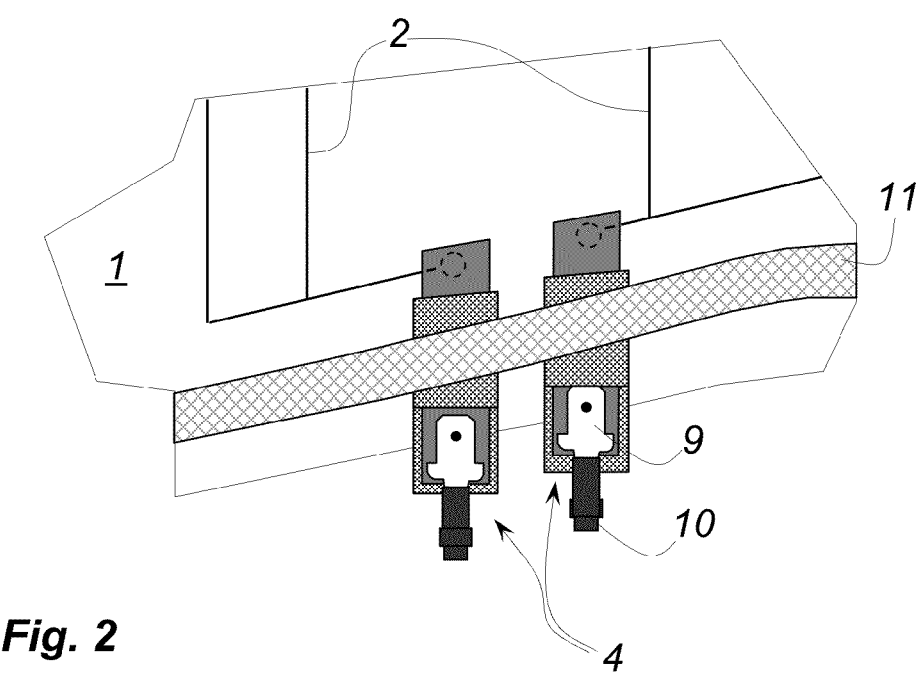
FIG. 2 shows a plan view of an edge of a windowpane corresponding to FIG. 1, on which two soldered connecting elements are provided one next to the other.

In FIG. 2, the view is from above onto the edge-side connecting region of the windowpane 1 which is also illustrated in FIG. 1. Two soldered connecting elements 4 are soldered right next to one another onto the surface of the windowpane here, each of them being electrically connected to a conductive structure 2 (for example antenna conductor or heating conductor) and of being led through under the strand 11 of adhesive. It is also clear that the two connecting points (to the conductive structure 2 on the one hand and to the cable 10 on the other) are significantly offset with respect to one another.

The flat-conductor soldered connecting elements 4 can already be bonded and soldered onto the outer surface of the one glass pane before the two rigid glass panes and the adhesive layer are connected. In highly mechanized fabrication this does not require a very high expenditure on work, and the expenditure on materials for the soldered connecting elements is low. The quality of the windowpane 1 is then assessed only after the manufacture of the ultimate composite. If this is then not sufficient, the additional loss of value is strictly limited because the soldered connecting elements are low in value per se.

Figure 3:
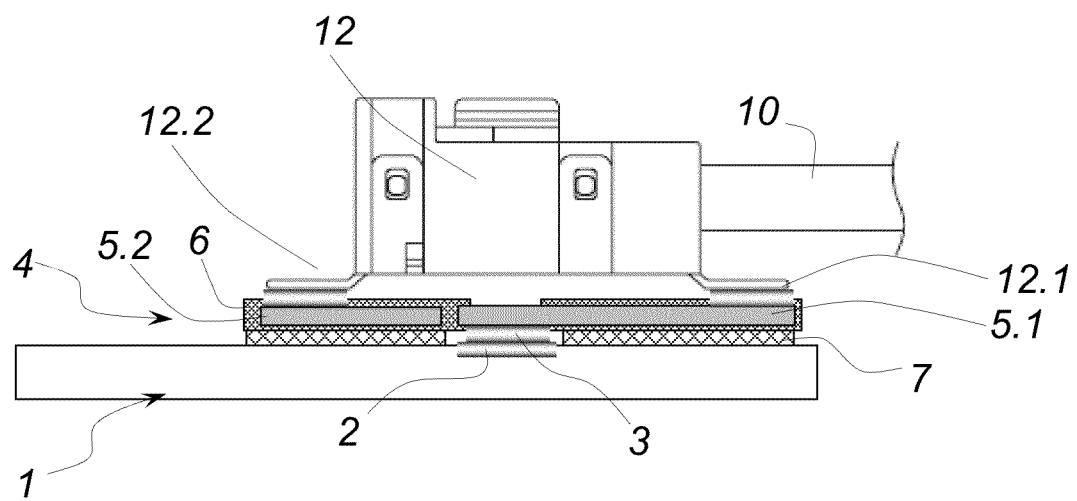
FIG. 3 shows a second embodiment in which a further electrical or electronic component (for example a decoupling inductor for antenna connection) is directly fitted onto the flat-conductor connecting element.

FIG. 3 illustrates an embodiment in which the soldered connecting element 4 which is bonded onto a surface of the windowpane comprises two separate conductive foils 5.1 and 5.2 which can therefore conduct different polarities (for example antenna signal and earth/reference potential). The conductive foil 5.1 is electrically connected at one of its ends to a conductive structure 2 by means of soldering at 3. At the other end, in turn a connecting surface is arranged on a recess in the insulating sleeve 6, to which recess a first soldering foot 12.1 of an electrical component 12 is soldered. A second soldering foot 12.2 of the same component is electrically connected in the same way to the second conductive foil 5.2.

Here too, the configuration of FIGS. 1 and 2 can be recognized again: the connecting points on the upper side of the soldered connecting element 4 are significantly offset laterally with respect to the soldering point on its underside. Both the insulating sleeve and the adhesive layer are located, as heat buffers with respect to the glass surface, under said connecting points and the conductive foil which is freely exposed in the upward direction there.

In addition, embodiments are conceivable in which a conductive foil is provided directly, without a separate insulating sleeve, with a comparatively thick and heat-resistant adhesive layer, and is therefore bonded onto the surface of a windowpane. This bonding layer then combines in itself the functions of adhesion and thermal protection. The material Y582 from 3M (acrylate adhesive) is a suitable adhesive for such purposes.

The invention claimed is:

1. A connecting element for a windowpane, comprising:
   a conductive structure connected with the windowpane;
   a line connection leading away from the windowpane, to provide electrical contact to the windowpane;
   at least one electrically conductive layer or foil soldered to the conductive structure and to a soldering surface of the line connection, whereby electrical contact between the line connection and the windowpane is provided through an electrical path comprising the soldering surface, the at least one electrically conductive layer or foil, and the conductive structure; and
   at least one electrically insulating buffer layer configured to be located at least between the at least one electrically conductive layer or foil and an outer surface of the windowpane, the electrically insulating buffer layer being further configured to expose the at least one electrically conductive layer or foil to the soldering surface of the line connection.

2. The connecting element of claim 1, wherein the electrically insulating buffer layer is configured to expose the at least one electrically conductive layer or foil to the soldering surface of the line connection along one or more soldering connection points.

3. The connecting element of claim 2, wherein the one or more soldering connection points are laterally offset with respect to a conductive structure connection point of the at least one electrically conductive layer or foil.

4. The connecting element of claim 3, wherein the connecting element is adhesively attached to the outer surface of the windowpane through an adhesive layer, and wherein the at least one electrically insulating buffer layer is further configured to be located between the one or more soldering connection points and the adhesive layer.

5. The connecting element of claim 2, wherein the line connection comprises a cable provided with a soldering foot, the soldering foot being soldered to a soldering connection point of the one or more soldering connection points.

6. The connecting element of claim 2, wherein the one or more soldering connection points are a first soldering connection point and a second soldering connection point.

7. The connecting element of claim 6, wherein the first soldering connection point and the second soldering connection point are offset with respect to the conductive structure over an extension of the connecting element along the windowpane.

8. The connecting element of claim 6, wherein the soldering surface comprises a first soldering foot connected with the first soldering connection point and a second soldering foot connected with the second soldering connection point.

9. The connecting element of claim 6, further comprising a strand of adhesive crossing the at least one electrically insulating buffer layer in a region between the first soldering connection point and the second soldering connection point.

10. The connecting element of claim 1, wherein the at least one electrically insulating buffer layer comprises either:
    an electrically insulating bonding layer, or
    an electrically insulating bonding layer and an electrically insulating plastic layer.

11. The connecting element of claim 1, wherein the at least one electrically insulating buffer layer is made of a thermoplastic adhesive.

12. The connecting element of claim 1, wherein the windowpane is a vehicle windowpane.

13. An arrangement comprising a plurality of connecting elements according to claim 1.

* * * * *

UNITED STATES PATENT AND TRADEMARK OFFICE
CERTIFICATE OF CORRECTION

PATENT NO. : 8,481,857 B2  Page 1 of 1
APPLICATION NO. : 12/744052
DATED : July 9, 2013
INVENTOR(S) : Bernhard Reul It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this
Eighth Day of September, 2015

Michelle K. Lee
*Director of the United States Patent and Trademark Office*